(12) United States Patent
Guo et al.

(10) Patent No.: US 7,937,741 B2
(45) Date of Patent: May 3, 2011

(54) PLATFORM NOISE ESTIMATION AND MITIGATION

(75) Inventors: Yongfang Guo, Sunnyvale, CA (US); Ernest T. Tsui, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 765 days.

(21) Appl. No.: 11/904,932

(22) Filed: Sep. 29, 2007

(65) Prior Publication Data

US 2009/0089851 A1    Apr. 2, 2009

(51) Int. Cl.
*H04N 7/16* (2006.01)
*H04N 7/173* (2006.01)

(52) U.S. Cl. ......... 725/139; 725/131; 725/141; 725/153

(58) Field of Classification Search .................. 725/131, 725/141, 153, 139
See application file for complete search history.

(56) References Cited

U.S. PATENT DOCUMENTS

| | | | |
|---|---|---|---|
| 2006/0088006 A1 | 4/2006 | Chimitt | |
| 2007/0019579 A1 | 1/2007 | Xu et al. | |
| 2008/0313692 A1* | 12/2008 | Yun et al. | 725/131 |

OTHER PUBLICATIONS

SIPO, People's Republic of China, First Office Action for CN Patent App. No. 200810178535.2, Mar. 1, 2010.

"China Approves DTV Standard", National Association of Broadcasters, TV TechCheck, (Oct. 30, 2006).
Amor, Hamed , "Integrated Services Digital Broadcasting an Introduction", Lectures Notes, downloaded from the Internet, http://www.fb9dv.uni-duisburg.de/vs/en/education/newbroad/Notes%20on%20ISDB%20-%20DMB.pdf.
Mehlfuhrer, Christian , et al., "A Robust MMSE Equalizer for MIMO Enhanced HSDPA", IEEE, in 40th Asilomar Conference on Signals, Systems, and Computers, Pacific Grove, CA, (Oct. 2006).
Pinson, E , "Get China Ready for Single Frequency Network! (using the Chinese DMB-T terrestrial DTV standard)", TeamCast, Rennes, France, (May 2, 2007).
Smith, Doug , "Digital Voice Update", ARRL Digital Voice Working Group, Doc. #26A, (Jul. 9, 2003).
Song, Jian , "Technical Review of the Chinese Digital Terrestrial Television Broadcasting Standard (DTMB)", DTV Technology R&D Center, Tsinghua University, Beijing, P.R. of China, (Dec. 18, 2006).
Tang, Zijian , et al., "RLS Direct Equalizer Estimation with Assistance of Pilots for Transmissions Over Time-Varying Channels", 13th European Signal Processing Conference, Antalya, Turkey, (Sep. 2005).
Office Action for Chinese Patent App. No. 200810178535.2 mailed Nov. 23, 2010.

* cited by examiner

*Primary Examiner* — Hunter B Lonsberry
(74) *Attorney, Agent, or Firm* — Blakely, Sokoloff, Taylor & Zafman LLP (57) ABSTRACT

A method and apparatus for platform noise estimation and mitigation are provided. An embodiment of a method for mitigating noise may include receiving a data signal in a system platform, where the data signal includes a received pseudo noise sequence. Noise on the system platform may be estimated based on the received pseudo noise sequence. In some embodiments the noise on the system platform may be mitigated based on the noise estimate for the system platform.

16 Claims, 6 Drawing Sheets

PLATFORM NOISE ESTIMATION AND MITIGATION

FIELD

Embodiments of the invention relate to electronic systems. More particularly, embodiments of the invention relate to a system and method for platform noise estimation and mitigation.

BACKGROUND

Electronics devices for consumers and businesses include increasingly more diverse functionalities. Among the functions being provided in various electronic systems, including various computer systems, is the reception of television or similar video streams. In an example, a mobile computing platform, such as a laptop computer or similar device, may include a video receiver. This type of implementation in a platform may vary greatly depending on the specific transmission specification, which may be dependent on the geographic region or other factors.

In electronic devices, noise can be generated by numerous different sources. In order to provide good performance in a system, it often is necessary to identify the source of the noise, determine the type of noise that is present, and to address the noise. However, it is not always possible to eliminate noise sources. The implementation of video reception into a platform would be hampered if there is excessive noise in the signal. The reception of high definition video may be very sensitive to platform noise.

Among the television standards that may be utilized for video is the recent China digital television standard. The standard is designated number GB20600-2006 of the SAC (Standardization Administration of China), and is entitled "Framing Structure, Channel Coding and Modulation for Digital Television Terrestrial Broadcasting System", issued Aug. 18, 2006. The standard may also be referred to as DMB-T (Digital Multimedia Broadcasting-Terrestrial) or DMB-T/H (Digital Multimedia Broadcasting Terrestrial/Handheld). This standard will generally be referred to herein as "DMB-T".

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

An embodiment of the invention concerns platform noise estimation and mitigation.

As used herein:

"Guard interval" means a portion of a signal inserted to prevent interference between transmissions. Guard intervals include intervals that are placed at the beginning or end of a time slot.

"Pseudo noise" or "PN" means a digital signal with noise-like properties. The term pseudo noise includes, but is not limited to, a pseudo noise sequence inserted in the guard interval (frame sync) of a DMB-T data frame.

In some embodiments, a system is provided to estimate noise on a system platform and to mitigate such noise. In some embodiments, noise is estimated utilizing an algorithm based on the guard intervals provided for data frames. In an embodiment, the estimation utilized the pseudo noise (PN) guard intervals provided in a signal.

In some embodiments, platform noise is mitigated based on a model of the platform. In an embodiment, a platform noise mitigation algorithm is based at least in part on the noise estimation for the system. In some embodiments, the noise mitigation is a MMSE (Minimum Mean Squared Error) process to reduce the noise levels in the system.

In an embodiment of the invention, a system provides for mitigation of noise in a platform utilizing pseudo noise sequence signaling. In an embodiment, a process is provided to mitigate noise in a platform that is consistent with the DMB-T standards, which utilize PN guard intervals between data transmissions.

Various standards are utilized for television transmission and reception, including DMB-T. An analysis of the DMB-T platform reveals a significant amount of platform noise, which is largely caused by clocks embedded in platform itself. The noise may severely degrade radio receiver performance. In some embodiments, a system is provided to address the platform noise estimation and mitigation for a DMB-T demodulator.

In the DMB-T standard, a PN sequence is used as a guard interval between transmissions. In telecommunications, guard intervals are used to ensure that distinct transmissions do not interfere with one another, allowing some immunity from propagation delays, echoes, and reflections. The use of the PN sequence is in contrast to the cyclic prefix used commonly in other transmissions. This structure utilized in DMB-T is referred to as TDS-OFDM (Time Domain Synchronization OFDM). OFDM (Orthogonal Frequency-Division Multiplexing) is a method of digital modulation in which a signal is split into several narrowband channels at different frequencies. DMB-T includes both a single-carrier vestigial sideband mode (VSB) and the multi-carrier Time Domain Synchronous OFDM mode). The multi-carrier transmitted signal conveys a series of hierarchical frames. Instead of the cyclic prefix used in other standards, in TDS-OFDM a "Frame Header" precedes each data-frame body to convey the PN sequence. The length of the guard interval can vary under the DMB-T. A longer guard interval allows a larger distance between transmitters because more distant echoes can be handled, but this reduces the useful bit rate.

The PN sequence in the guard interval is a key factor in frequency offset estimation, sampling clock offset estimation, symbol timing estimation and channel estimation. In DMB-T operation, synchronization blocks, including frequency/sampling clock/timing offset estimation, use a time domain cross-correlation between the received PN sequence and the known transmit PN sequence. It is known that cross-correlation is generally robust to platform noise. However, in operation platform noise may degrade the data recovery on each OFDM sub-carrier significantly.

In some embodiments, a system utilizes a platform noise estimation and mitigation process to improve the data recovery performance. The process includes:

(1) A PN sequence based platform noise estimation algorithm is utilized to estimate a platform noise covariance matrix; and (2) An MMSE (Minimum Mean Squared Error) equalization that contains platform noise covariance matrix information is implemented to improve the final BER (Bit Error Rate) performance.

In conventional DMB-T receiver design, the noise that is encountered in a platform is generally assumed to be uncorrelated and to be represented as white Gaussian noise. However, a study of the platform reveals that the platform noise spectrum is not flat. The major characteristics of the platform noise may be summarized as following:

(1) The noise interference is largely composed of harmonics of one or more clock frequencies.

(2) In the platform, there are at least three kinds of platform noise: broadband, spread clock and narrow band.

(3) The spread clock is frequency modulated. In general, spread clock output has become a major noise source because of the requirement to pass FCC (Federal Communications Commission) requirements. The spread clock has 0.25-3% signal spreading.

(4) In such a platform, the spatial correlation between two receiving antennas that are embedded into a compact device, such as a notebook computer, is high.

(5) However, the platform noise is generally stable over time. Thus, the noise may be addressed with a stable solution.

It may be shown that the platform noise power over a particular 8 MHz (494-502 MHz) wide channel at two receive antennas is (in one particular implementation) approximately 19 dB and 16 dB higher than system noise floor, with a 5 dB noise floor figure being assumed. In this example, the spread clock is about 2 MHz wide and modulation frequency is about 32 KHz. In an exemplary platform, the noise at the two receiving antennas is highly correlated. It may be determined that the noise that is present is caused in general by harmonics of a display dot clock and data clock. Such noise may degrade the DMB-T receiver performance significantly.

In some embodiments, by estimating the platform noise power and the noise correlation coefficients, a process may operate to improve DMB-T receiver performance by taking the platform noise spatial correlation into account. In some embodiments, the platform noise estimation and mitigation algorithms are implemented in a receiver.

At a point in which a receiver reaches a stable stage (in which case the residual frequency offset and sampling clock offset is relatively small), the receiver can conduct demodulation, which includes channel estimation, equalization, detection and decoding. However, platform noise, which is frequency selective, degrades frequency domain demodulation performance significantly. In some embodiments, an estimate is made of the covariance matrix of platform noise. In some embodiments, a process then takes advantage of high correlation of platform noise seen at the two receive antennas to minimize the demodulation performance degradation using MMSE based equalization.

In an embodiment, a standard DMB-T receiver architecture is modified to add platform noise estimation blocks and to replace MRC (Mutually Referenced Equalizer) by MMSE (Minimum Mean Squared Error) equalization combining for channel equalization.

In some embodiments, a PN sequence based platform noise estimation algorithm is used to estimate the platform noise covariance matrix. The noise estimation may be made as follows:

(1) An FFT is conducted on the received PN sequence $r_m$ of the mth OFDM symbol frame at the first antenna:

$$N_{rx}^1 = \sqrt{L/M} FFT(r_m, L) \quad [1]$$

where L=3780 (length of OFDM symbol) and M=420 (length of guard interval) (This length of the guard interval may vary in different implementations)

(2) An FFT is conducted on the known transmit PN sequence $PN_m$:

$$N_{tx} = \sqrt{L/M} FFT(PN_m, L) \quad [2]$$

(3) The N noise over the i subcarrier of the mth OFDM symbol for the first antenna is given by:

$$N_m^1(i) = N_{rx}^1(i) - H_m^1(i) N_{tx}(i) \quad [3]$$

where $H_m^1(i)$ is the estimated channel state information over the ith subcarrier of the mth OFDM symbol frame at the first antenna.

(4) The above processes 1-3 are repeated for the second antenna, and the following is then obtained:

$$N_m^2(i) = N_{rx}^2(i) - H_m^2(i) N_{tx}(i) \quad [4]$$

(5) The instantaneous noise covariance matrix over the ith subcarrier at two receiver antennas of the mth OFDM symbol is calculated as:

$$r_{md}(i) = [N_m^1(i) N_m^2(i)]^H [N_m^1(i) N_m^2(i)] \quad [5]$$

where $A^H$ means the conjugate transposition of matrix A.

(6) Using, for example, an AR averaging as one approach, the averaged noise covariance matrix for the mth OFDM symbol is determined as:

$$R_m(i) = (1-\alpha) R_{m-1}(i) + \alpha r_m(i) \quad [6]$$

where $\alpha$ is an AR (autoregressive) coefficient in the range (0,1).

In some embodiments, the above algorithm is not only usable to determine platform noise, but in addition other system noise may to be estimated using this instantaneous platform noise estimation algorithm.

After the platform noise covariance matrix information is available at the receiver based on the noise estimation, in some embodiments an MMSE equalization is implemented. In this process, the equalization takes advantage of the noise correlation between the two receive antenna to minimize the impact of platform noise.

Given the noise covariance matrix $R_m(i)$ and the estimated channel $$\hat{H}_m(i) = \begin{bmatrix} H_m^1(i) \\ H_m^2(i) \end{bmatrix}$$

over the i th subcarrier, the estimated transmit signal $\hat{x}_m(i)$ can be obtained by MMSE equalizer as $$\hat{x}_m(i) = \hat{H}_m(i)^H (\hat{H}_m(i) \hat{H}_m(i)^H + R_m(i))^{-1} Y_m(i) \quad [7]$$

where $$Y_m(i) = \begin{bmatrix} Y_m^1(i) \\ Y_m^2(i) \end{bmatrix}$$

is the received signal over the ith subcarrier at two receiver antennas of the mth OFDM.

A weighting factor for soft-bit calculation is then given by $$CSI_m(i) = \hat{H}_m(i)^H R_m(i)^{-1} \hat{H}_m(i) \quad [8]$$

Figure 1:
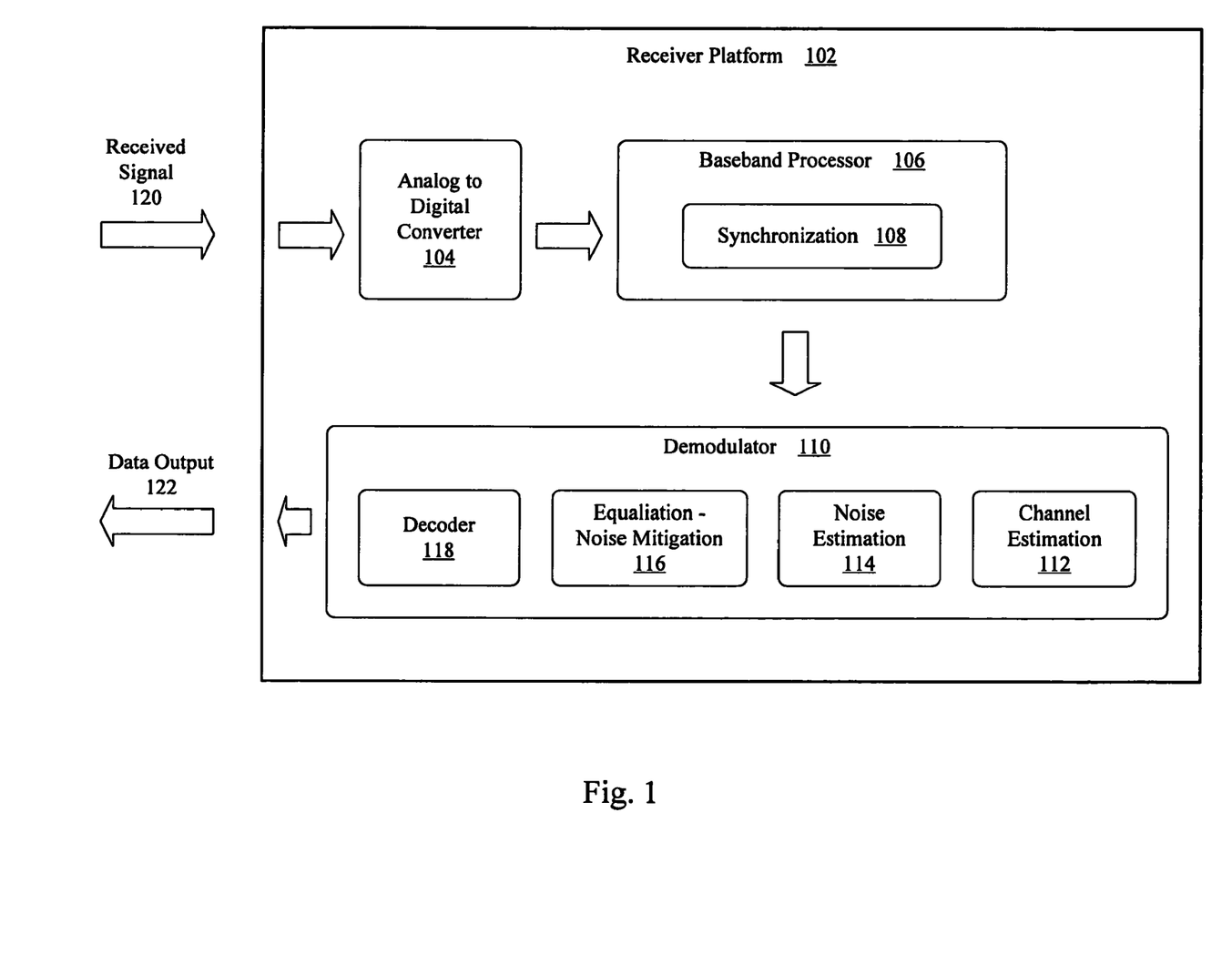
FIG. 1 is an illustration of an embodiment of a system to reduce platform noise

FIG. 1 is an illustration of an embodiment of a system to reduce platform noise. In this illustration, a receiver platform 102 may be utilized to receive a digital signal 120, which may include a digital television signal. The digital television signal may be a signal sent pursuant to the DMB-T standard for terrestrial television. The digital signal 120 may be received in multiple channels, such as received for multiple antennas of the receiver platform 102.

The received signal may be provided to an analog to digital converter 104, which may include a converter element for signal channel. The converted signal may be provided to a baseband processor 106, which may include signal synchronization 108. The signal may then be provided to a demodulator 110, which may include multiple elements. The demodulator may include channel estimation 112. In some embodiments, the demodulator 110 may further include a noise estimation module or unit 114, the noise estimation being based at least in part on a guard interval provided between data transmissions, included a pseudo noise delineator provided in the DMB-T standard.

The receiver platform may further include a signal equalization module or unit 116. In some embodiments, the signal equalization 116 may include noise mitigation. In an embodiment, the noise mitigation may be based at least in part on the noise estimate 114. The mitigated signal then be provided to a decoder 118, resulting in the generation of the data output 122.

Figure 2:
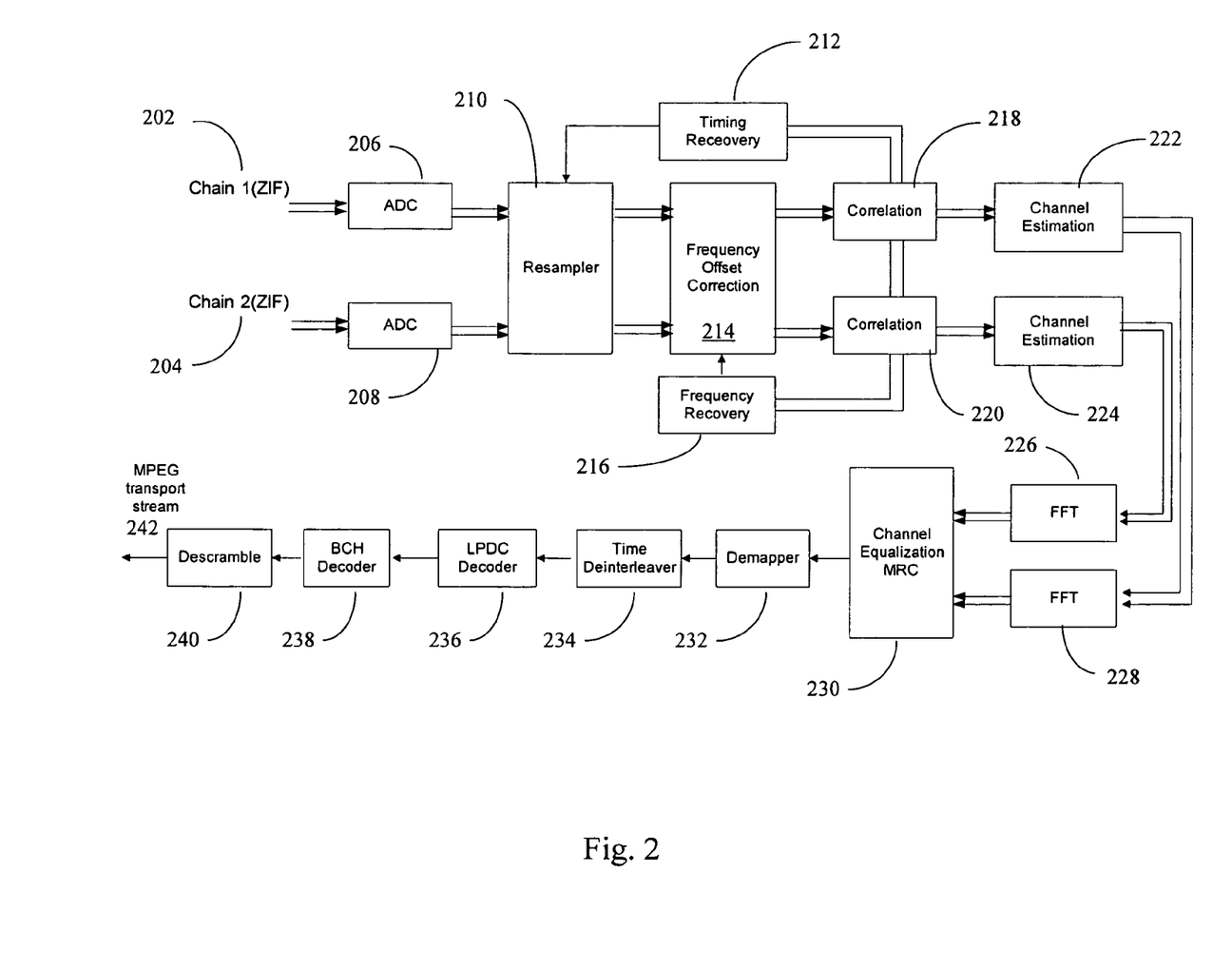
FIG. 2 illustrates a high level diagram of an embodiment of a receiver architecture.

FIG. 2 illustrates a high level diagram of a receiver architecture. A receiver operating under the DMB-T standard is illustrated. In this figure, a diversity receiver is considered, receiving a first received signal, chain-1 202, and a second received signal, chain-2 204. ZIF represents a zero IF receiver, indicating a direct conversion from RF (radio frequency) to baseband without any IF (intermediate frequency) stages. After the down converter (which is not shown in this illustration) and an analog to digital converter (ADC) for each signal chain (206 and 208), the receiver commences baseband processing.

A first stage of the baseband processing is synchronization, in which a sampling clock/carrier frequency/timing offset estimation and correction is conducted. In the illustration, a resampler 210 receives the output of the ADC units and provided the resampled data to a frequency offset correction module 214, which provides corrected data to a correlation module for each signal chain 218 and 220. The correlation modules 218 and 220 provide frequency recovery 216 to the frequency offset correction module 214, and timing recovery 212 to the resampler 210. When the residual sampling clock/carrier frequency offset is small enough, the receiver starts demodulation in which channel estimation, maximum ratio combining and decoding are conducted. The correlation modules 218-220 provide output to channel estimation modules for each channel, 222 and 224. The channel estimation modules 222-224 provide data to the fast Fourier transform (FFT) modules 226-228, which then each provide the data for the channel equalization MRC (Mutually Referenced Equalizer) 230.

The resulting equalized channel data is provided to a demapper 232, a time interleaver 234, an LPDC (Low Density Parity Check) decoder 236, a BCH (Bose-Chaudhuri-Hocquenghem) decoder 238 (which processes each block to correct errors and recovers the original code), and a descrambler 240, resulting in the resulting data stream, shown as an MPEG (Moving Pictures Experts Group) transport stream 242. In some embodiments, the platform architecture is modified to provide for noise estimation based on pseudo noise intervals used in frame transmission. In some embodiments, the platform architecture is modified to mitigate platform noise based on the noise estimation.

Figure 3:
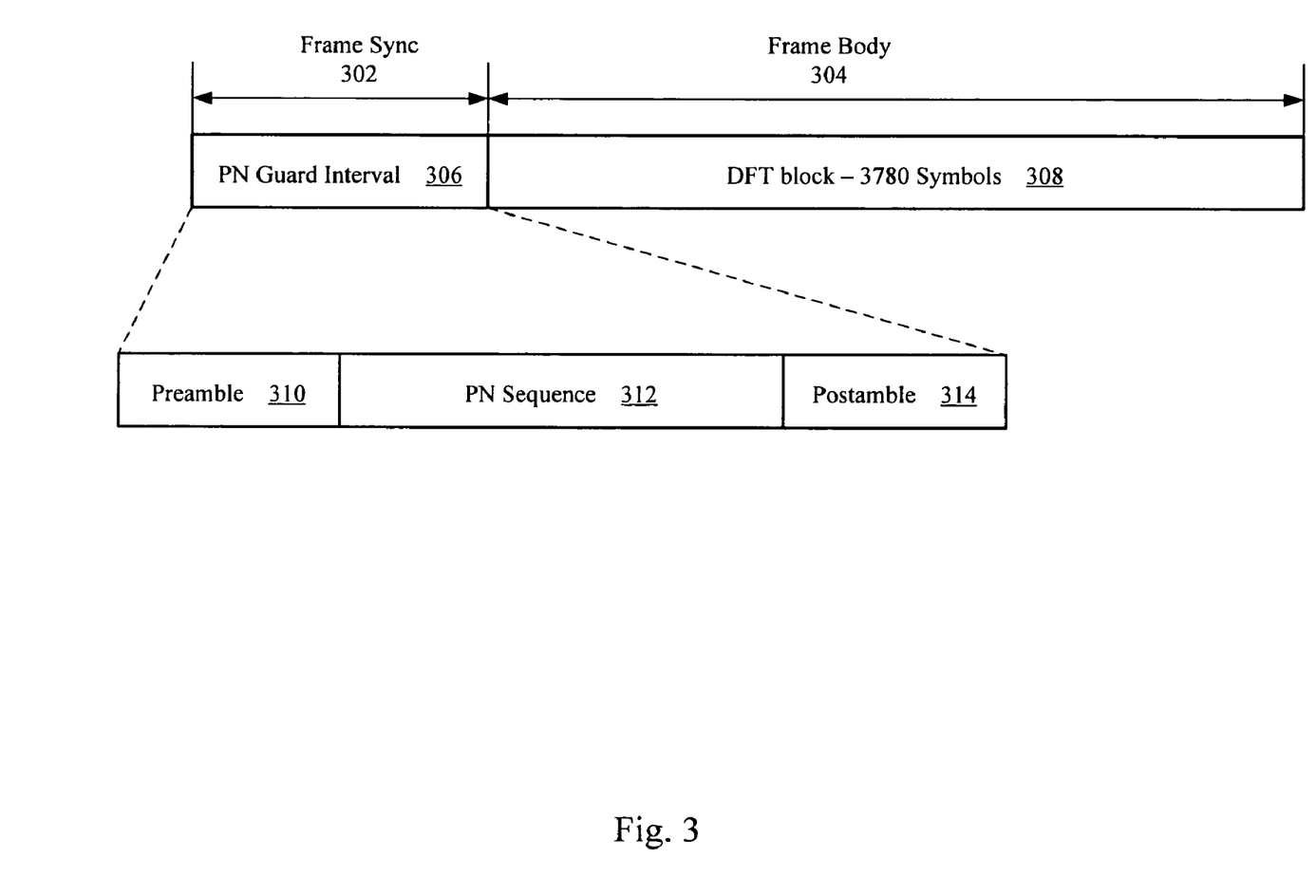
FIG. 3 is an illustration of a signal frame.

In the downlink physical channel of TDS-OFDM, signals are transmitted in frames. In this type of system, the signal frame consists of two parts: the frame sync (synchronization) and the frame body. For example, a signal frame may be as shown in FIG. 3. In this illustration, a signal frame is shown as a frame sync 302 followed by the frame body 304. The frame sync 302 represents a PN guard interval 306, providing separation between data transmissions. The PN guard interval 106 includes a pre-amble 310, a PN sequence 312, which in one example has 255 symbols, and a post-amble 314. The frame body 104 comprises a DFT (discrete Fourier transform) block, which in this example include 3780 symbols. QPSK (Quadrature Phase-Shift Keying) modulation is used for a PN sequence to provide robust synchronization. The PN sequences in the frame sync 302 are defined as an $8^{th}$ order m-sequence and implemented by a Fibonacci type linear feedback shift register (LFSR). Based on initial states of LFSR, 255 m-sequence values with different phases can be generated. Different signal frames have varying PN sequences in order to provide guarantee of signal frame addressing. The time domain cross correlation between received PN sequences and known transmitted PN sequences are keyed for frequency offset, sampling clock offset, timing and channel estimation. The time domain cross correlation operation is robust to platform noise. However, platform noise degrades frequency domain demodulation performance significantly. In some embodiment, a platform noise estimation and mitigation algorithm process in the frequency domain is provided to improve final TV signal reception performance.

Figure 4:
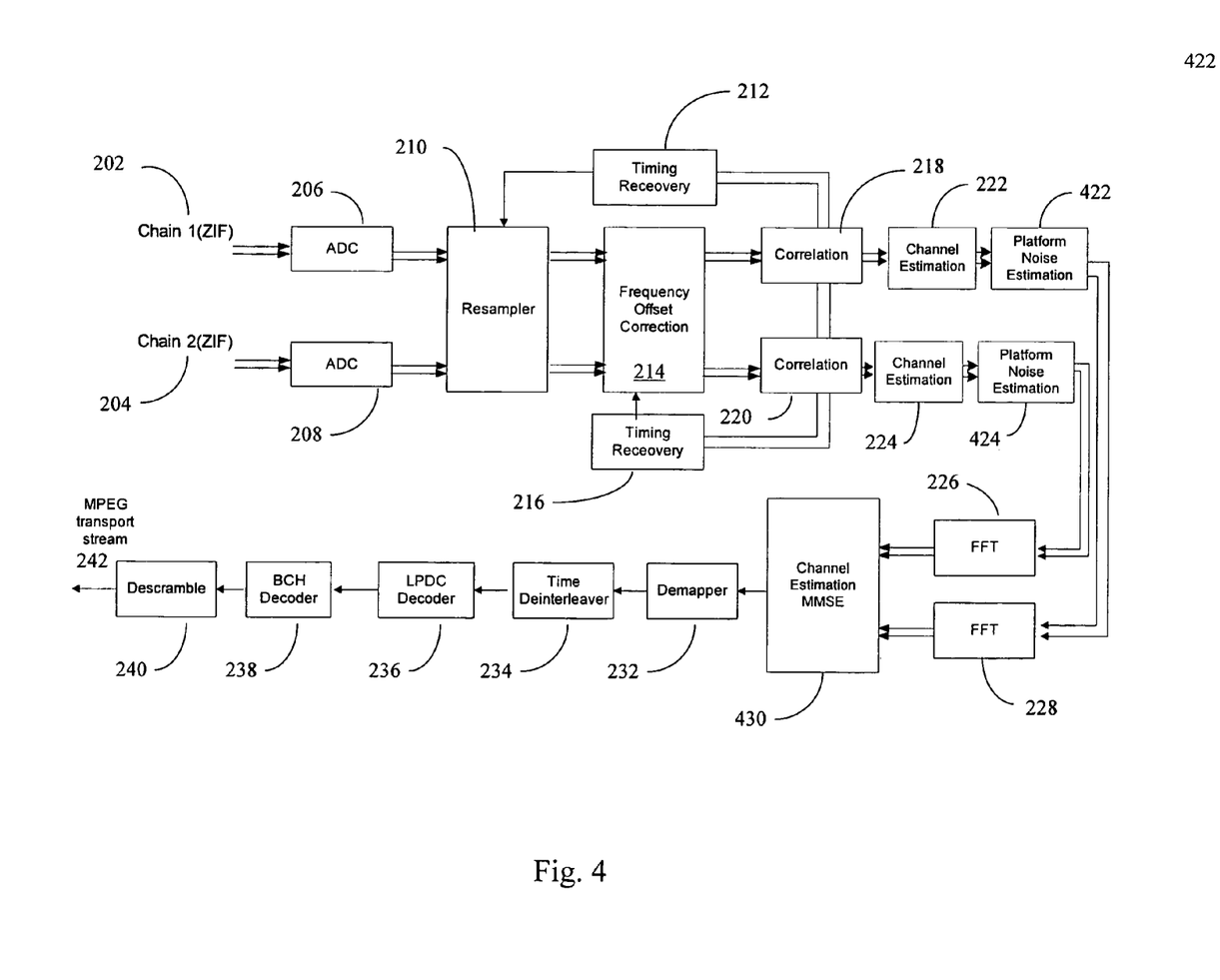
FIG. 4 is an illustration of an embodiment of a receiver architecture.

FIG. 4 is an illustration of an embodiment of a receiver architecture. In this illustration, a receiver operating under the DMB-T standard is illustrated, with similar elements as shown in FIG. 2. After channel estimation 222-224, a platform noise estimation 422-424 is based at least in part on a pseudo noise element provided in the signal frame, such as PN guard interval 306 illustrated in FIG. 3. In some embodiments, the estimated noise is provided to the channel equalization 430, which includes MMSE equalization to mitigate the channel noise based at least in part on the platform noise estimate. In some embodiments, the noise mitigation may provide for improved performance for the receiver platform.

Figure 5:
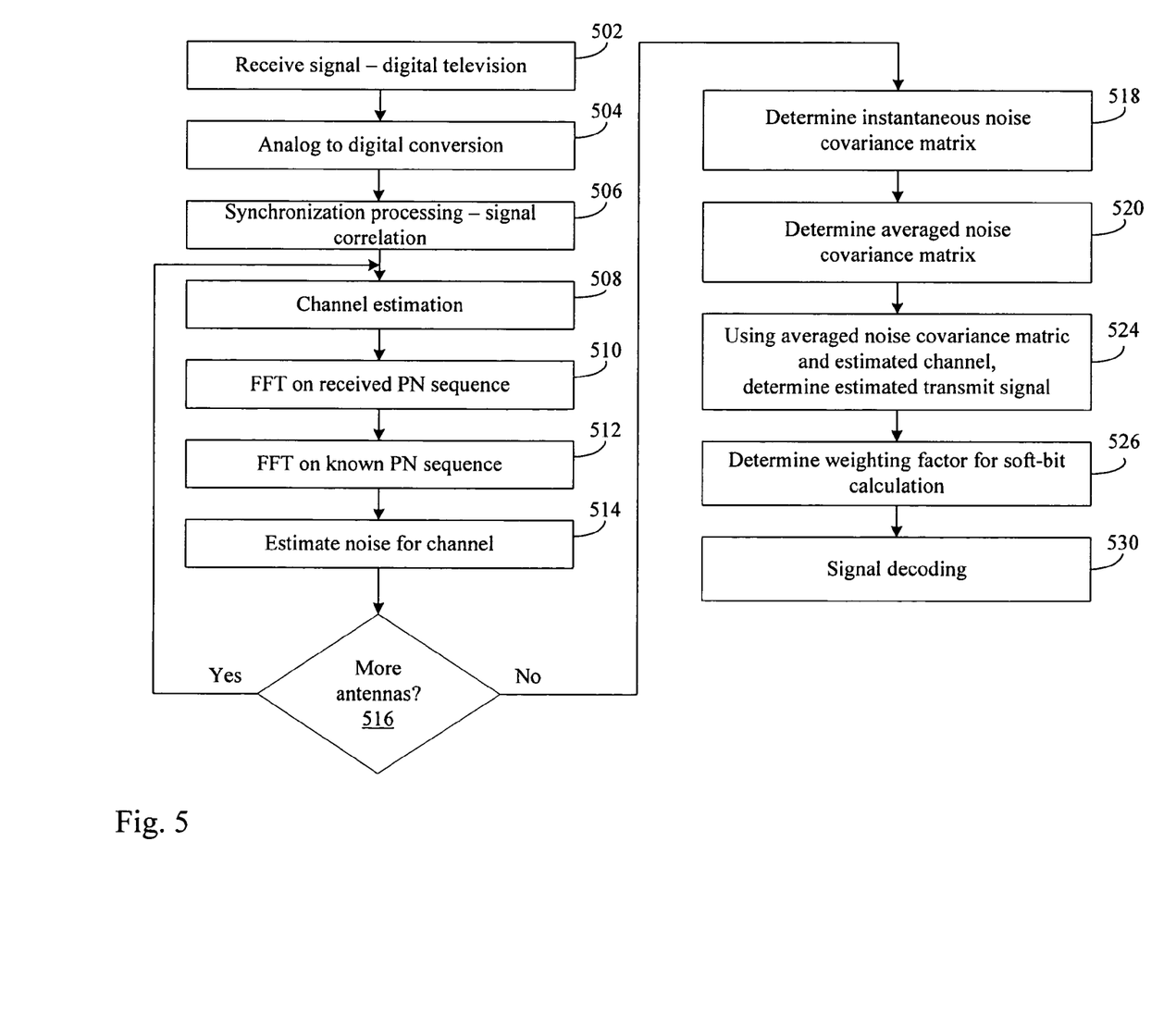
FIG. 5 is a flowchart to illustrate an embodiment of a process for noise estimation and mitigation.

FIG. 5 is a flowchart to illustrate an embodiment of a process for noise estimation and mitigation. In this illustration, a signal is received. The signal may include a digital signal utilizing a pseudo noise sequence, including, for example, a signal provided according to the DMB-T digital television standard. Subsequent to analog to digital conversion 504 and synchronization processing, including signal correlation 506, channel estimation 508 is conducted. After channel estimation, the noise estimation based on the PN sequence is conducted. In this process, an FFT is conducted on the received PN sequence for a channel 510 (such as the signal received by a first antenna), and an FFT is conducted on the known or expected PN sequence 512. Utilizing such information, the noise for the channel is estimated 514. If there are more antennas 516, the channel and noise estimation process 508-514 is conducted for each channel. (While for simplicity in illustration each channel is shown to be processed by the same series of processes, the channels would normally be processed in parallel.)

An instantaneous noise covariance matrix is calculated 518 based on the channel noise estimates, and an averaged noise covariance matrix is determined utilized the instantaneous noise determination 520. Using the averaged noise covariance matrix and the estimated channel, an MMSE equalizer is used to estimate the transmit signal 524. A weighting factor is then determined for soft-bit calculation 526 and the resulting data is decoded 530 to produce the data output.

Figure 6:
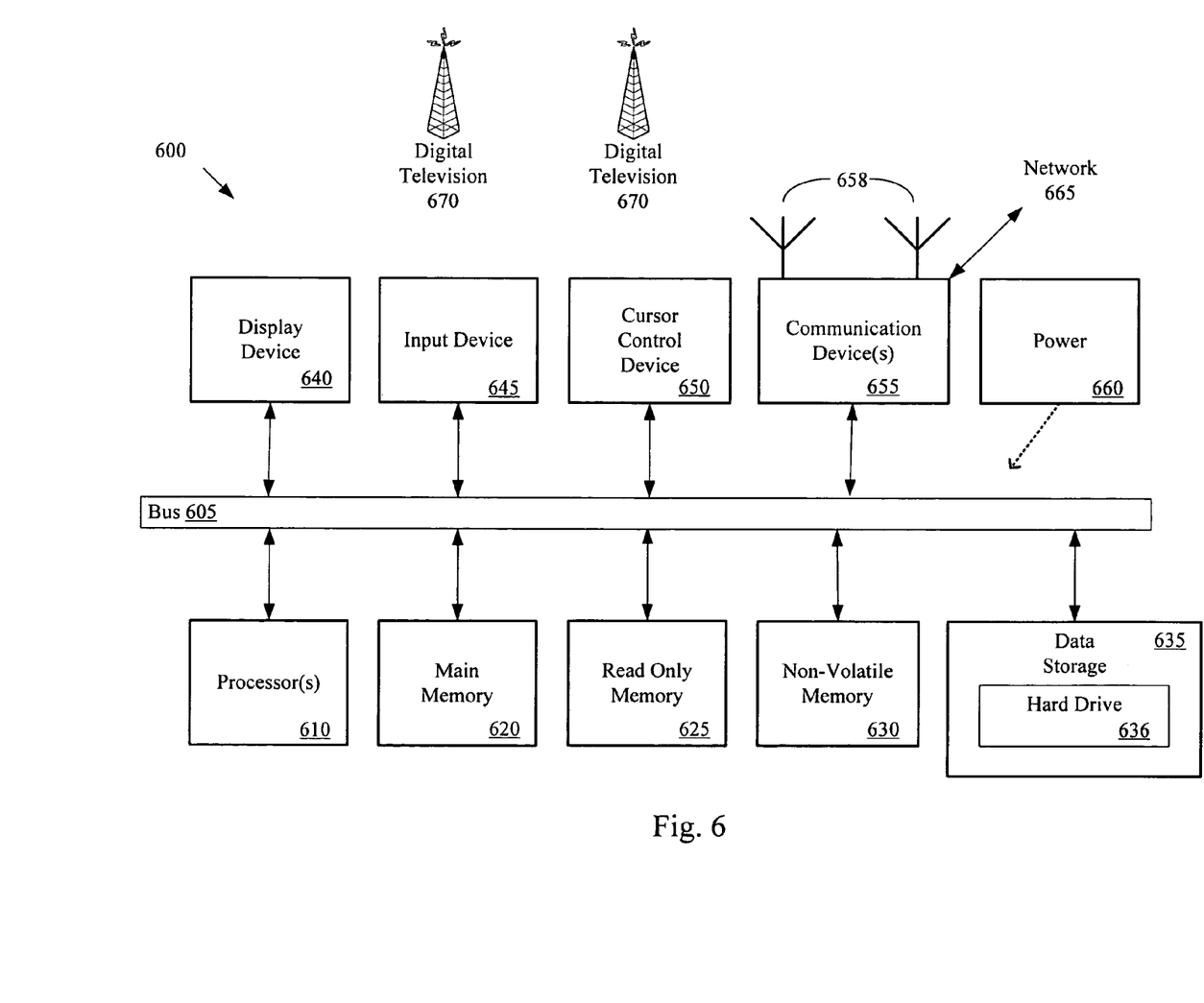
FIG. 6 is an illustration of a computer system that may be utilized in an embodiment of the invention.

FIG. 6 is an illustration of a computer system that may be utilized in an embodiment of the invention. FIG. 6 may include, but is not limited to, a notebook computer or similar compact electronic device. In this illustration, certain standard and well-known components that are not germane to the present invention are not shown. Under an embodiment of the invention, a computer 600 comprises a bus 605 or other communication means for communicating information, and a processing means such as one or more processors 610 coupled with the bus 605 for processing information. The processors 610 may comprise one or more physical processors and one or more logical processors. Further, each of the processors 610 may include multiple processor cores. The computer 600 is illustrated with a single bus 605 for simplicity, but the computer may have multiple different buses and the component connections to such buses may vary. The bus 605 shown in FIG. 6 is an abstraction that represents any one or more separate physical buses, point-to-point connections, or both connected by appropriate bridges, adapters, or controllers. The bus 605, may include, for example, a system bus, a Peripheral Component Interconnect (PCI) bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements)

In an embodiment of the invention, the processors 610 may be utilized to support one or more virtual machines. In an embodiment of the invention, the computer 600 further comprises a random access memory (RAM) or other dynamic storage device as a main memory 620 for storing information and instructions to be executed by the processors 610. Main memory 620 also may be used for storing temporary variables or other intermediate information during execution of instructions by the processors 610. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In an embodiment of the invention, memory of the system may include a shared memory, such as a shared BIOS/OS memory, that is accessible by multiple agents in the computer system. The computer 600 also may comprise a read only memory (ROM) 6625 or other static storage device for storing static information and instructions for the processors 610. The computer 600 may include one or more non-volatile memory devices 630 for the storage of certain elements, including, but not limited to, system BIOS and one or more pre-OS applications.

Data storage 635 may also be coupled to the bus 605 of the computer 600 for storing information and instructions. The data storage 635 may include a magnetic disk, an optical disc and its corresponding drive, or other memory device. Such elements may be combined together or may be separate components, and utilize parts of other elements of the computer 600. In a particular embodiment of the invention, the data storage 635 may include a hard drive 636, which may provide persistent memory for the swapping of data to and from the main memory 620.

The computer 600 may also be coupled via the bus 605 to a display device 640, such as a cathode ray tube (CRT) display, a liquid crystal display (LCD), a plasma display, or any other display technology, for displaying information to an end user. In some embodiments, the display device may be utilized to display television programming. In some environments, the display device 640 may include a touch-screen that is also utilized as at least a part of an input device. In some environments, the display device 640 may be or may include an audio device, such as a speaker for providing audio information, including the audio portion of a television program. An input device 645 may be coupled to the bus 605 for communicating information and/or command selections to the processors 610. In various implementations, input device 645 may be a keyboard, a keypad, a touch-screen and stylus, a voice-activated system, or other input device, or combinations of such devices. Another type of user input device that may be included is a cursor control device 650, such as a mouse, a trackball, or cursor direction keys for communicating direction information and command selections to the one or more processors 610 and for controlling cursor movement on the display device 640.

One or more communication devices 655 may also be coupled to the bus 655. Depending upon the particular implementation, the communication device 620 may include a transceiver, a wireless modem, a network interface card, LAN (Local Area Network) on motherboard, or other interface device. The uses of a communication device 655 may include reception of signals from wireless devices. For radio communications, the communication device 655 may include one or more antennas 658, including any dipole or monopole antennas, as required. In an embodiment, the communication device 655 includes a receiver for television signals, including the reception of DBM-T digital television signals via the antennas 658. As illustrated, the communication device may receive digital television signals from one or more digital televisions transmitters 670. In one embodiment, the communication device 655 may include a firewall to protect the computer 600 from improper access. The computer 600 may also be linked to a network, such as network 665, or to other devices using the communication devices 655, which may include links to the Internet, a local area network, or another environment. The computer 600 may also comprise a power device or system 660, which may comprise a power supply, a battery, a solar cell, a fuel cell, or other system or device for providing or generating power. The power provided by the power device or system 626 may be distributed as required to elements of the computer 600.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but processes can be added to or deleted from any of the methods and information can be added or subtracted from any of the described messages without departing from the basic scope of the present invention. It will be apparent to those skilled in the art that further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method for mitigating noise comprising:
   receiving a data signal in a system platform, the data signal including a received pseudo noise sequence, wherein the pseudo noise sequence is included in a guard interval for a frame of data;
   estimating noise on the system platform based on the received pseudo noise sequence; and
   mitigating the noise based on the noise estimate for the system platform.

2. The method of claim 1, wherein the data signal is a television signal.

3. The method of claim 2, wherein the television signal is compliant with the DMB-T (Digital Multimedia Broadcasting-Terrestrial) standards.

4. The method of claim 1, wherein the noise is mitigated using an MMSE (Minimum Mean Squared Error) equalization based on the estimated noise.

5. The method of claim 4, wherein MMSE equalization includes a platform noise covariance matrix.

6. A receiver comprising:
   an analog to digital converter to convert a received signal to digital data, the data including one or more data frames;
   a baseband processor to synchronize the digital data; and
   a demodulator, the demodulator including:
      a noise estimation module, the noise estimation module to estimate noise based at least in part on a pseudo random sequence in the digital data, wherein the pseudo noise sequence is included in a guard interval for a frame of data, and
      a noise mitigation module, the noise mitigation module to counter noise in the receiver based at least in part on the estimated noise.

7. The method of claim 1, wherein estimating noise on the system platform includes:
   estimating a channel state;
   conducting a fast Fourier transform (FFT) on the received pseudo noise sequence;
   conducting an FFT on an expected pseudo noise sequence; and
   determining a difference between the FFT of the received pseudo noise sequence and a product of the estimated channel state and the FFT of the expected pseudo noise sequence.

8. The receiver of claim 6, wherein the noise mitigation module includes MMSE (Minimum Mean Squared Error) equalization based on the estimated noise.

9. The receiver of claim 8, wherein MMSE equalization uses a platform noise covariance matrix to estimate a transmitted signal.

10. The receiver of claim 6, wherein the receiver is compliant with the DMB-T (Digital Multimedia Broadcasting-Terrestrial) standards.

11. The receiver of claim 6, wherein estimating noise by the noise estimation module includes:
   estimating a channel state;
   conducting a fast Fourier transform (FFT) on the received pseudo noise sequence;
   conducting an FFT on an expected pseudo noise sequence; and
   determining a difference between the FFT of the received pseudo noise sequence and a product of the estimated channel state and the FFT of the expected pseudo noise sequence.

12. A computer system comprising:
a bus;
a processor coupled with the bus;
a plurality of dipole antennas to receive television signals; and
a receiver coupled with the bus and the plurality of antennas, the receiver to process the television signals, the receiver including:
- a noise estimation unit, the noise estimation unit to estimate platform noise for the receiver, the noise estimation unit to estimate the platform noise using a guard interval in the television signals, wherein the guard interval includes a received pseudo noise sequence, and
- a noise mitigation unit, the noise mitigation unit to mitigate the platform noise for the receiver based on the estimated platform noise.

13. The computer system of claim 12, wherein the noise mitigation unit utilizes MMSE (Minimum Mean Squared Error) equalization based on the estimated platform noise.

14. The computer system of claim 13, wherein the MMSE equalization includes a platform noise covariance matrix.

15. The computer system of claim 12, wherein the receiver is compliant with the DMB-T (Digital Multimedia Broadcasting - Terrestrial) standards.

16. The computer system of claim 12, wherein estimating noise by the noise estimation module includes:
estimating a channel state;
conducting a fast Fourier transform (FFT) on the received pseudo noise sequence;
conducting an FFT on an expected pseudo noise sequence; and
determining a difference between the FFT of the received pseudo noise sequence and a product of the estimated channel state and the FFT of the expected pseudo noise sequence.

* * * * *